United States Patent [19]
Glatt

[11] 3,886,911
[45] June 3, 1975

[54] INTERNAL COMBUSTION TROCOIDAL ROTARY ENGINES WITH ROTATABLE INTAKE AND EXHAUST PORTS

[76] Inventor: Otto G. Glatt, 169 Boiling Springs Ave., East Rutherford, N.J.

[22] Filed: Dec. 17, 1973

[21] Appl. No.: 425,521

[52] U.S. Cl. .................. 123/8.45; 123/8.05; 60/901
[51] Int. Cl. ........................ F02b 55/14; F02b 53/06
[58] Field of Search ....... 128/8.13, 8.05, 8.09, 8.45, 128/8.01, 106, 107, 108; 60/39.61

[56] References Cited
UNITED STATES PATENTS

| 260,513 | 7/1882 | Wigmore | 123/8.13 |
| 1,970,569 | 8/1934 | Lachapelle | 123/8.05 |
| 2,154,095 | 4/1939 | Jones | 123/8.05 |
| 3,347,213 | 10/1967 | Froede | 123/8.45 |
| 3,610,210 | 10/1971 | Odawara | 123/8.05 |
| 3,637,332 | 1/1972 | McAnally | 123/8.05 |
| 3,762,376 | 10/1973 | Eberle | 123/8.09 |
| 3,777,720 | 12/1973 | Williams | 123/8.09 |
| 3,800,760 | 4/1974 | Knee | 123/8.09 |

*Primary Examiner*—Clarence R. Gordon

[57] ABSTRACT

This invention pertains to both standard and double action rotary piston internal combustion engines whose intake and exhaust ports are automatically advanced and retarded with respect to the rotating piston, through the entire engine speed range.

5 Claims, 5 Drawing Figures

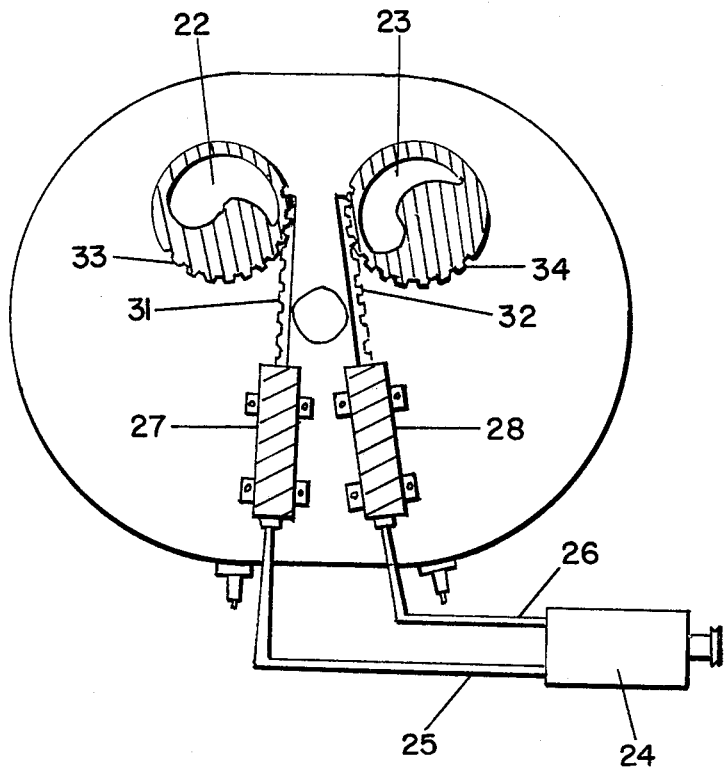
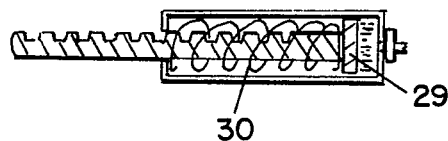
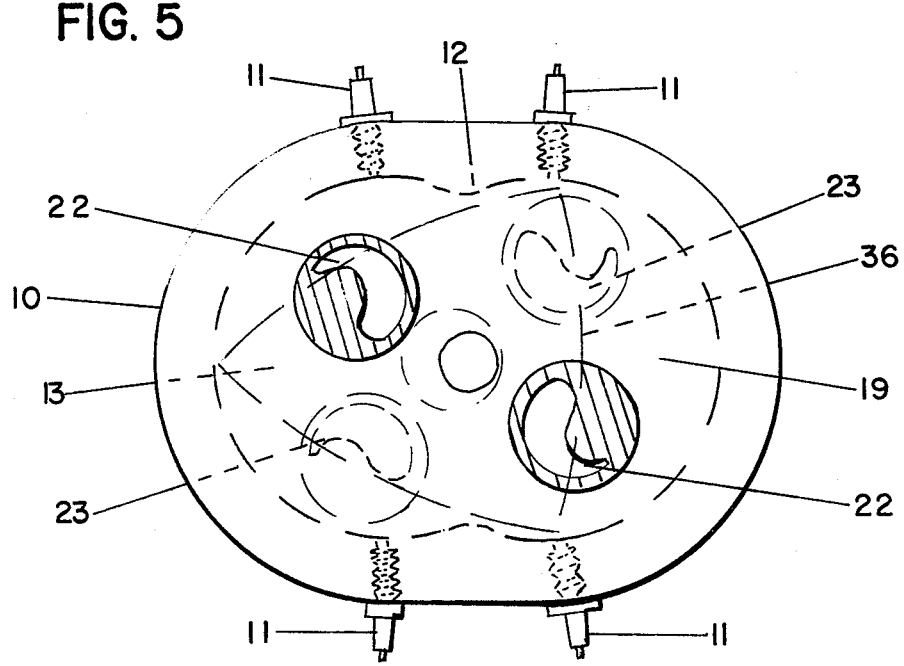

3,886,911

INTERNAL COMBUSTION TROCOIDAL ROTARY ENGINES WITH ROTATABLE INTAKE AND EXHAUST PORTS

BACKGROUND OF THE INVENTION

Presently, intake and exhaust ports of trochoidal type rotary piston internal combustion engines are stationary and are positioned with respect to the revolving piston (rotor) so as to enable the engine to operate most efficiently in the mid-range engine speeds.

It is, therefore, an object of this invention to eliminate this wasteful compromise and extract maximum efficiency from rotary engines of this type.

SUMMARY OF INVENTION

An object of this invention is to enable trochoidal type internal combustion rotary engines to operate most efficiently throughout their entire engine speed ranges.

It is a further object of this invention to make practical the efficient operation of a double action rotary piston internal combustion engine, i.e. a trochoidal type rotary engine having six ignition impulses per revolution.

A third object of this invention is to continously and automatically reposition the intake and/or exhaust port openings so as to extract maximum efficiency from a trochoidal type rotary engine throughout the entire engine speed range.

DESCRIPTION OF DRAWINGS

FIG. 3 is a rear view of a trochoidal type rotary engine showing the ports, housings and the mechanism for automatically rotating them.

FIG. 4 is a sectional view of the sliding gear plunger.

FIG. 5 is a transparent view of a double action trochoidal type internal combustion rotary engine; i.e., a rotary engine having six ignition impulses per revolution, with a rotatable intake and exhaust port system.

DESCRIPTION OF PREFERRED EMBODIMENT

Figure 1:
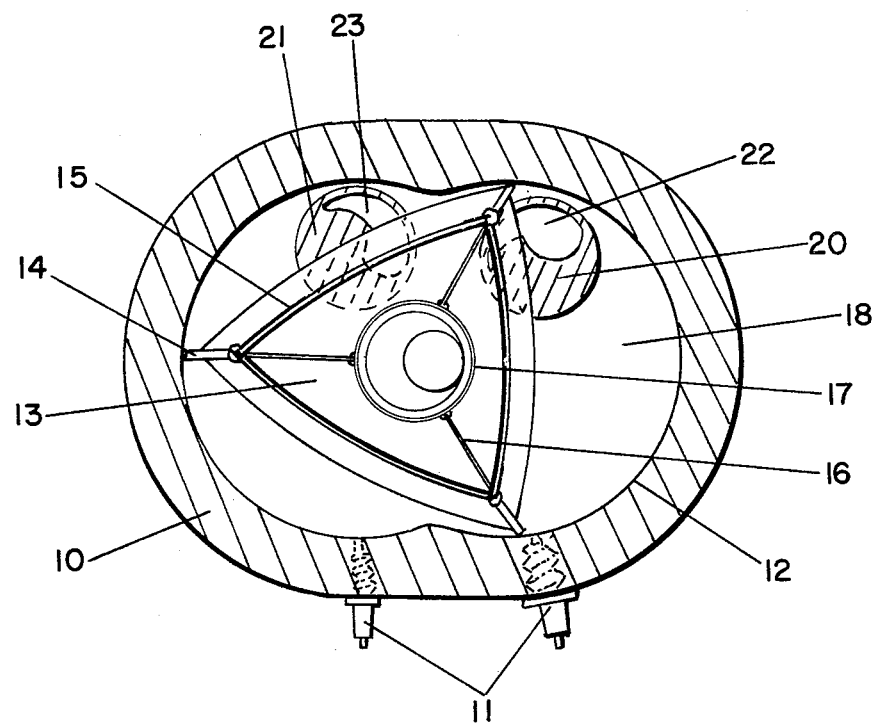
FIG. 1 is a view of a trochoidal type rotary engine with its front sidewall removed showing the rotary piston and the rotatable intake and exhaust ports and housings positioned in the rear sidewall.

FIG. 1 is a general view of a rotary piston internal combustion engine of the trochoidal type showing the peripheral housing 10 with threaded spark plugs 11 therein; said housing having a basically smooth epitrochoidal inner surface 12 of two lobes and a generally triangular shaped rotor 13. Each apex of the rotor contains a tip seal 14; while in each side of the rotor are compression seals 15, inter-chamber seals 16 and circular center seals 17. Said side seals 15 slide over rear sidewall 18 and front sidewall 19, FIG. 5.

Transpiercing the rear sidewall 18, FIG. 1, are the rotatable intake housing 20, the rotatable exhaust housing 21, and their respective tear shaped port openings 22 and 23.

In FIG. 3 hydraulic pump 24, which is driven by the rotary engine itself, forces hydraulic fluid through the hydaulic lines 25 and 26 into hydraulic cylinders 27 and 28 where it forces their respective sliding gear plungers 29, (see detailed drawing FIG. 4), to compress their respective return springs 30, thus forwarding the geared portions 31 and 32 of said plungers. This action rotates ring gears 33 and 34 which are pinned 35, FIG. 2, to their respective port housings 20 and 21. Therefore, the respective ports 22 and 23 are rotated to a position giving maximum efficiency.

As the intake port 22 advances in relation to the revolving rotor 13 the opening time is advanced and the closing time is retarded allowing more of a fuel mixture to enter the compression chamber. The exhaust port 23 also advances in relation to the revolving rotor 13 and stays open longer allowing larger volumes of burned gases to escape. This continuing action enables this engine to operate at maximum efficiency at all engine speeds.

FIG. 5 is a transparent general view of a double action internal combustion trochoidal type rotary piston engine incorporating the rotatable intake and exhaust port system; the difference being that there are two sets of each.

After ignition at one piston head 36 and the inner peripheral surface 12 by means of spark plugs 11 at the top portion of the peripheral housing 10 the expanding gases escape through rotatable exhaust port 23 in rear sidewall 18. As rotor 13 rotates to the position shown in FIG. 5 exhaust gases rushing out through exhaust port 23 form a partial vacuum pulling in a fresh fuel mixture through the now open rotatable intake port 22. This is a momentary scavenging action. As the rotor revolves still further both ports are closed off and compression begins, after which the mixture is ignited at the lower portion of the peripheral housing 10 at the same piston head 36 and the lower inner peripheral surface 12.

This sequence of events takes place once again as the rotor 13 completes its cycle. Since there are three piston heads on the rotor, there are six ignition impulses for every complete revolution of the rotor.

Seeing as all ports are rotatable, maximum efficiency is attained throughout the entire engine speed range.

Figure 2:
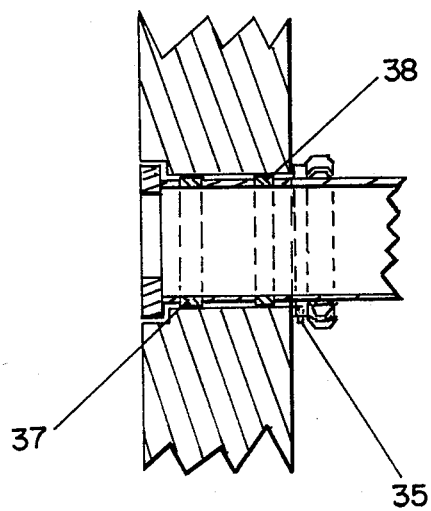
FIG. 2 is a side sectional view of a sidewall and port with housing.

Note that said port housings rotate within port ring seals 37 and 38, FIG. 2.

I claim:

1. A rotary internal combustion engine of the trochoidal type comprising:
    a housing having epitrochoidal inner chamber of at least two lobes,
    a triangularly shaped rotor eccentrically journalled within said housing,
    seal means on said rotor whereby said seal means are in sealing relationship with the surface of said epitrochoidal chamber,
    at least two spark plugs mounted on said housing,
    an intake port means and an exhaust port means, each of said port means having a variable opening means for rotatably journalling said intake port means and exhaust port means on said housing,
    and means responsive to the speed of said engine for controlling the rotation of said respective port means to vary the exposed opening of said respective variable port opening accordingly whereby the size of the port opening increases with engine speed.

2. The invention as defined in claim 1 wherein said respective port openings are tear shaped.

3. The invention as defined in claim 1 wherein said housing includes an interior smooth side wall, and said intake port means and exhaust port means are disposed in said side wall.

4. The invention as defined in claim 3 wherein each of said port means comprises port housing rotatably journalled in said side wall, a ring gear journalled to said port housing, and said means responsive to said engine speed includes, a gear plunger disposed in meshing relationship with said ring gear, and hydraulic pump for activating said gear plunger, and means connecting said hydraulic pump to said engine.

5. The invention as defined in claim 1 and including a second set of spark plugs, and a second intake and exhaust port, and said second intake and exhaust ports having a variable port opening.

* * * * *